United States Patent [19]
Gage et al.

[11] Patent Number: 5,805,536
[45] Date of Patent: Sep. 8, 1998

[54] METHOD FOR BANDWIDTH REDUCTION IN WRITEABLE OPTICAL DATA STORAGE APPARATUS

[75] Inventors: Edward C. Gage, Fairport; Steven C. Dohmeier, Rochester; Mark V. Hettel, Penfield, all of N.Y.

[73] Assignee: Eastman Kodak Company, Rochester, N.Y.

[21] Appl. No.: 740,348

[22] Filed: Nov. 7, 1996

[51] Int. Cl.⁶ .................................................. G11B 11/00
[52] U.S. Cl. ........................... 369/13; 369/124; 369/116
[58] Field of Search ........................... 369/13, 116, 107, 369/106, 110, 124, 44.25, 44.32, 120, 54, 100, 44.34, 44.13, 59, 44.37

[56] References Cited

U.S. PATENT DOCUMENTS

| | | | |
|---|---|---|---|
| 4,691,308 | 9/1987 | Takagi et al. ............................... | 369/13 |
| 5,282,188 | 1/1994 | Gage ........................................ | 369/110 |
| 5,309,423 | 5/1994 | Noguchi et al. .......................... | 369/110 |
| 5,339,302 | 8/1994 | Takahashi et al. ........................ | 369/54 |
| 5,363,363 | 11/1994 | Gage ........................................ | 369/116 |
| 5,398,227 | 3/1995 | Miyaoka et al. .......................... | 369/116 |
| 5,491,682 | 2/1996 | Dohmeier et al. ....................... | 369/124 |
| 5,519,679 | 5/1996 | Gage ........................................ | 369/44.34 |
| 5,537,383 | 7/1996 | Gage et al. .............................. | 369/116 |
| 5,586,101 | 12/1996 | Gage et al. .............................. | 369/124 |
| 5,696,752 | 12/1997 | Hajjar et al. ............................. | 369/124 |

FOREIGN PATENT DOCUMENTS

4-298836  10/1992  Japan.

*Primary Examiner*—Ali Neyzari
*Attorney, Agent, or Firm*—Raymond L. Owens

[57] ABSTRACT

A method for reading data from an optical medium having improved settling time characteristics and reduced bandwidth requirements, including producing a gain adjusted front facet monitor signal from a laser light beam, producing first and second data signals from data read from the medium, and producing first and second gain adjusted data signals in response to the gain adjusted front facet monitor signal and first and second data signals, respectively. The method further includes producing a magneto-optic data signal in response to the first and second gain adjusted data signals, the magneto-optic data signal being a function of the difference between the first and second gain adjusted data signals; or producing a combined data signal in response to the first and second gain adjusted data signals, the combined data signal being a function of the sum of the first and second gain adjusted data signals, and producing a write-once data signal in response to the gain adjusted front facet monitor signal and the combined data signal, the write-once data signal being a function of the difference between the gain adjusted front facet monitor signal and the combined data signal.

16 Claims, 2 Drawing Sheets

METHOD FOR BANDWIDTH REDUCTION IN WRITEABLE OPTICAL DATA STORAGE APPARATUS

CROSS REFERENCE TO RELATED APPLICATION

Reference is made to commonly-assigned U.S. patent application Ser. No. 08/745,038 filed concurrently herewith, entitled "BANDWIDTH REDUCTION IN WRITEABLE OPTICAL DATA STORAGE APPARATUS" by Gage et al, the teachings of which are incorporated herein by reference.

FIELD OF THE INVENTION

The present invention relates generally to methods for reading recorded data from both magneto-optic and write-once media as well as other types of optical media.

BACKGROUND OF THE INVENTION

Optical storage systems typically use a radiation beam generated and processed in an optical head to record data on and/or retrieve data from an optical storage medium. Many of these systems utilize differential detection in order to detect small reflected signal fluctuations in the presence of other signal components and/or system noise. An example is a conventional magneto-optic (MO) system, in which data is stored on an MO medium in the form of marks having a distinct magnetic orientation. MO systems generally utilize Kerr rotation of a return beam reflected from the MO medium to distinguish marked and unmarked areas. The Kerr rotation produces relatively small variations in the return beam and is therefore difficult to detect without differential detection. Differential detection channels are typically provided in the MO system by separating the return beam into two orthogonal polarization components using a polarization beam splitter. The components are incident on separate detectors, and the resulting data signals are applied to inputs of a differential amplifier which generates a differential MO data signal representative of the stored data.

In systems with differential detection channels, it is usually important to maximize the common-mode noise rejection in order to ensure optimal performance. Significant degradation in output data signal carrier-to-noise ratio (CNR) can result if, for example, one or more of the elements in the differential channels do not provide substantially equivalent gain and/or phase variations. Prior art techniques addressing this problem have utilized, for example, strict optical head alignment and performance tolerances, or variable gain components in one or more of the differential detection channels. U.S. Pat. No. 4,691,308 discloses an MO system with differential detection channels and a variable gain in one channel. The variable gain is adjusted in response to an error signal corresponding to amplitude differences between the data signals. The variable gain adjustment attempts to reduce the amplitude difference between the data signals such that common-mode rejection in the differential amplifier is improved. However, this one-channel variable gain system is susceptible to a number of problems, including long-term drift in signal levels, variable phase shifts as a function of signal level, and poor recovery from non-ideal conditions such as out-of-focus or media defects. Other problems with one-channel variable gain systems include the inability to adequately compensate for spurious output signal modulation resulting from, for example, media birefringence.

Japanese Patent Publication No. 4-298836 entitled "Magneto-optical Recording and Reproducing Device" appears to disclose an MO detection system which uses a pair of level control circuits controlled in accordance with "double refractivity information." However, this system does not appear to improve common-mode rejection in differential detection. Furthermore, it apparently utilizes a common control signal for both level control circuits and thus fails to solve the long-term drift, output signal modulation and other problems inherent in the one-channel variable gain system of U.S. Pat. No. 4,691,308.

Optical systems with differential detection channels can also be used to generate a density-type data signal from a write-once (WO) medium by summing the two data signals. As the term is used herein, WO media are intended to include erasable phase change media and read-only media such as compact disks (CDs) which are usually generated from a master recording. A system which generates a WO data signal is often susceptible to the effects of a number of different types of system noise. For example, a laser diode or other optical source used to read recorded data can exhibit mode-hopping or other instabilities which cause variations in the power level of the read beam. Such instabilities can be generally referred to as optical source noise or relative intensity noise (RIN). RIN represents a type of common-mode noise, that is, a noise component which is common to differential detection channels in the optical head. As noted above, common-mode noise can be substantially eliminated in generating an MO data signal because the data signals are subtracted. However, common-mode noise remains in a WO data signal in which the data signals are summed.

An exemplary technique which uses subtraction of a front facet monitor signal to limit the effects of RIN and other types of common-mode system noise on a WO data signal is described in U.S. Pat. No. 5,363,363 entitled "Apparatus and Method For Laser Noise Cancellation in an Optical Storage System Using a Front Facet Monitor Signal," which is assigned to the assignee of the present invention and incorporated by reference herein. One embodiment of the technique involves subtracting a front facet monitor (FFM) signal representative of the optical source intensity from the WO data signal in a differential amplifier. The resulting noise reduction generally depends upon proper gain and phase matching of the data and FFM signal channels. Commonly assigned U.S. Pat. No. 5,491,682 entitled "Apparatus and Method for Controllable Gain and Phase Matching in an Optical Data Storage System with Source Noise Subtraction," the disclosure of which is incorporated herein by reference, discloses the use of a variable gain servo loop to adjust a summed data signal as a function of an FFM signal prior to subtraction. This technique, however, cannot correct for coversheet or media substrate birefringence which can affect the individual data signals differently. As a result, common-mode noise rejection is limited.

Commonly assigned U.S. Pat. No. 5,537,383 entitled "Optical Data Storage System with Differential Data Detection and Source Noise Subtraction for Use with Magneto-Optic, Write-Once and Other Optical Media," the disclosure of which is incorporated herein by reference, improves upon the above-noted source noise subtraction techniques for WO signal generation and differential detection techniques for MO signal generation by reducing long-term signal level drift relative to prior art variable gain systems. One embodiment of the technique uses subtraction of an FFM signal for WO signals to reduce the effects of RIN, as well as separately-controlled variable gain differential detection channels for MO signals. The gain control circuits automatically adjust the gain of the differential detection channels in response to amplitude differences between the corresponding data signals and a fixed DC voltage. The source noise subtraction technique includes a source power control circuit which varies the gain so that the FFM signal tracks the fixed DC voltage as well. One drawback to this technique is that the differential detection channels and the source power control circuit are servoed to a fixed reference voltage which is independent of signal changes. During the transition from reading to writing, the amplitudes of the FFM and differential detection signals change from one level to another. This gain is approximately a factor of four difference or larger between the signals. Thus, a high bandwidth response is required to go from write to read as the output levels of the three circuits are continually being driven to the fixed reference voltage. This higher servo bandwidth degrades the low frequency data response.

Although the above-noted exemplary optical system provides considerable improvement in WO and MO data signal quality, there remains a need for an optical apparatus which can provide for both differential detection for MO signals and source noise subtraction for WO signals with reduced amplifier bandwidth requirements.

SUMMARY OF THE INVENTION

Accordingly, it is an object of the present invention to provide a method for reducing amplifier bandwidth requirements in optical reading apparatus.

This object is achieved by an apparatus for reading data from an optical medium with reduced bandwidth, comprising:

(a) producing a gain adjusted front facet monitor signal from a laser light beam;

(b) producing first and second data signals from data read from the medium;

(c) producing first and second gain adjusted data signals in response to the gain adjusted front facet monitor signal and first and second data signals, respectively; and (d) producing a magneto-optic data signal in response to the first and second gain adjusted data signals, the magneto-optic data signal being a function of the difference between the first and second gain adjusted data signals; or producing a combined data signal in response to the first and second gain adjusted data signals, the combined data signal being a function of the sum of the first and second gain adjusted data signals and producing a write-once data signal in response to the gain adjusted front facet monitor signal and the combined data signal, the write-once data signal being a function of the difference between the gain adjusted front facet monitor signal and the combined data signal.

ADVANTAGES

An advantage of the present invention is to provide a method for reading optical media having improved settling time characteristics of the data detection channels and reduced bandwidth of the gain adjustment circuitry.

Another advantage of the present invention is to provide a method for decreasing optical reading apparatus detection channel and system noise.

A feature of the present invention is that the method of the present invention provides simplification of the front facet servo electronics required in prior art methods.

DETAILED DESCRIPTION OF THE INVENTION

To facilitate understanding, identical reference numerals have been used, where possible, to designate identical elements that are common to the figures.

Although the present invention will be illustrated herein primarily in terms of generating magneto-optic (MO) and write-once (WO) data signals from MO and WO media, respectively, it should be understood that this is by way of example and not limitation. The invention can be utilized with any of a number of other types of optical media, including ablative and write-once and erasable phase-change media. The invention should be understood as a method of balancing and differential detection and reducing source noise from a sum density detection and can be applied to other methods such as wobbled groove signal detection and data readout. Those skilled in the art can readily adapt the teachings of the present invention to these and other alternative media.

Figure 1:
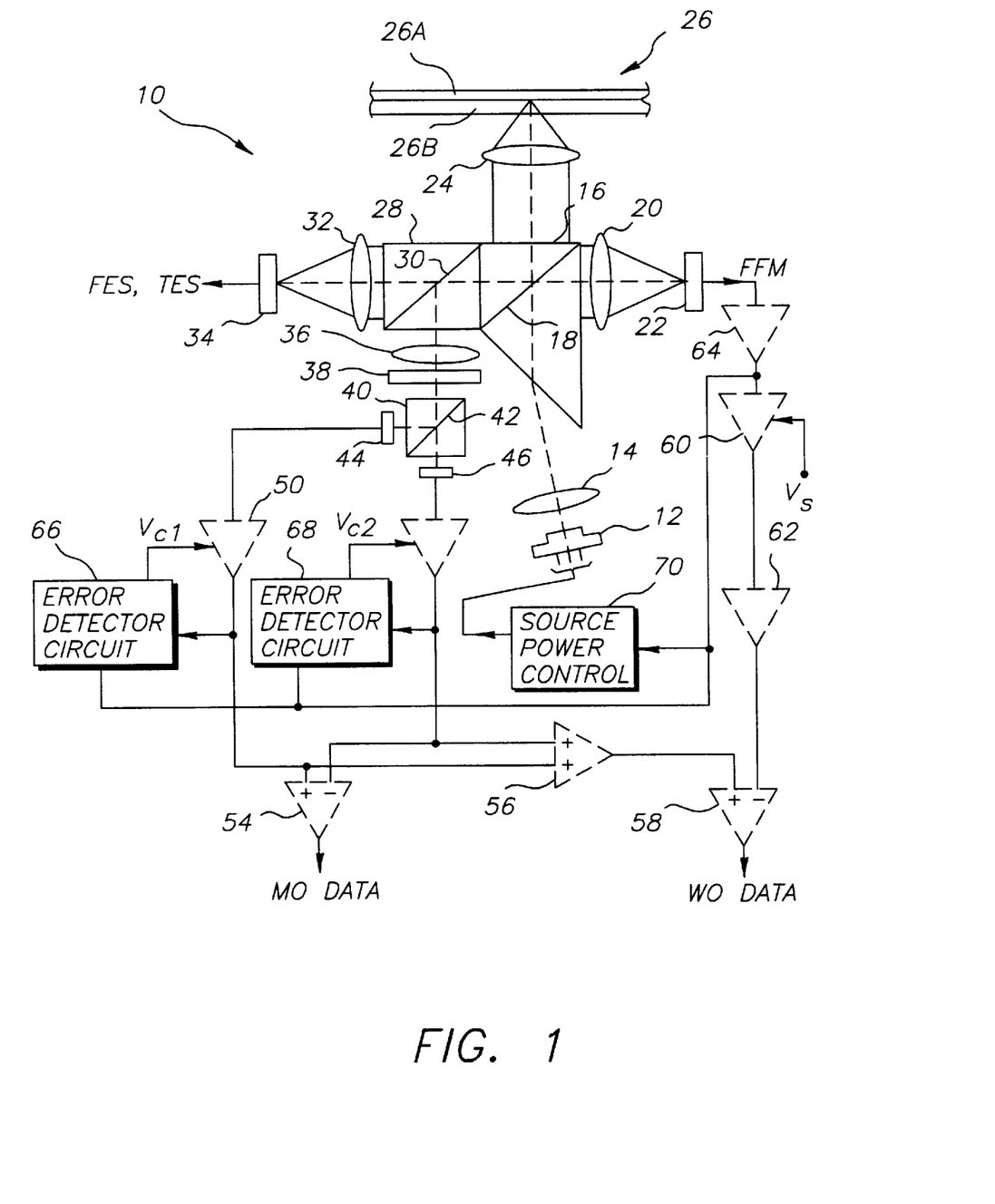
FIG. 1 is a schematic diagram of an apparatus for reading data from an optical medium having a front facet servo control to generate magneto-optic and write-once data signals in accordance with the present invention.

Referring to FIG. 1, an optical apparatus 10 in accordance with the present invention is shown which utilizes a front facet servo control and differential detection channels to generate both MO and WO data signals. An incident radiation beam is generated by an optical source 12, which can be, for example, a laser diode, a laser or an LED. Optical source 12 produces an incident radiation beam at a given wavelength, which will generally vary depending upon the application. An exemplary wavelength suitable for use in apparatus 10 is about 780 nanometers. The radiation beam from optical source 12 is collimated by a collimating lens 14, which in this embodiment can have a focal length on the order of 8 mm. The collimated radiation beam is transmitted through a polarization beam expander/splitter 16. Alternative beam expansion techniques could be used, such as including a circularizing lens (not shown) in the path of the incident beam, and would generally alter the desired focal length of lens 14. A suitable circularizing lens is the model VPS700 lens available from Blue Sky Research of San Jose, Calif.

The beam expander/splitter 16 can have an s-polarization reflectivity of near 100% and a p-polarization reflectivity of about 20%, indicating that 100% and 20% of the intensity of the s-polarized beam components and p-polarized beam components, respectively, are reflected by an internal surface 18, and any remaining portions are transmitted through the surface 18. A portion of the incident radiation beam is thus reflected by surface 18 toward a detector focusing lens 20 and thereby focused onto a front facet detector 22. The reflected portion of the linearly-polarized radiation beam thus includes both s-polarized and p-polarized components, which are detected by the front facet detector 22 to provide an indication of the intensity level of the incident radiation beam. The front facet detector 22 is also referred to as a front facet monitor (FFM) or, more generally, an optical source monitor. As will be described in greater detail below, the FFM signal from front facet detector 22 is used in a front facet subtraction technique to reduce source noise in a WO data signal, as well as in a source power servo loop 70 to maintain the output power level of source 12 at a desired value.

The portion of the incident radiation beam which is not reflected by surface 18 to the front facet detector 22 passes through surface 18 and is incident on an objective lens 24. The surface 18 of polarization beam splitter/expander 16 transmits a linear p-polarization of the radiation beam, which is perpendicular to the s-polarized portion of the radiation beam reflected by surface 18. The direction of the incident beam can be altered by including additional optical elements (not shown), such as a turning prism or fully-reflecting mirror, between the beam splitter 16 and the objective lens 24. For example, a turning prism or reflecting mirror could be arranged to reflect the beams by 90° to facilitate placement of the components of apparatus 10 relative to the storage medium in a reduced-height optical disk drive.

Objective lens 24 focuses the incident beam onto an optical storage medium 26. Optical components 14, 16 and 24 represent only an exemplary means of applying an incident radiation beam to the storage medium 26, and any of a number of other arrangements of components could be used as an application means herein. The storage medium 26 typically includes data tracks (not shown) arranged in a spiral or concentric circles on a data storage surface 26A. A portion of the storage medium 26 is shown in a side-sectional view in FIG. 1. The storage medium 26 can include a transparent substrate 26B which serves as a protective layer over the data storage surface 26A. The storage medium 26 can also include a pregroove or similar light-diffracting structure suitable for generating a tracking error signal (TES) using known techniques. The incident radiation beam reads data previously recorded in the form of marks on the storage medium 26 by detecting variations in a return beam reflected from the medium 26. Apparatus 10 can also be used to record data on the medium 26 by modifying the power level of the incident beam or by providing additional recording system elements, the placement and operation of which are generally well-known in the art.

It will now be assumed that storage medium 26 is an MO medium. The incident beam applied to the MO medium 26 usually has a substantially linear polarization. Interaction with the data storage surface 26A causes the incident radiation beam to be reflected and diffracted therefrom. The resulting radiation beam, referred to herein as a return beam, generally has an elliptical polarization due to Kerr effect variations produced at the MO medium surface. It should be noted that in other embodiments the return beam can be either reflected or diffracted from the medium, or even transmitted through the medium in embodiments utilizing, for example, an optical tape storage medium. The return beam is collimated by objective lens 24, substantially reflected by surface 18, and then applied to a polarization beam splitter 28 which can have an s-polarization reflectivity of near 100% and a p-polarization reflectivity of about 75%. As a result, internal surface 30 of the polarization beam splitter 28 transmits about 25% of the p-polarized portion of the beam incident thereon to a detector focusing lens 32. The lens 32 focuses the transmitted portion of the beam onto a detector 34, which can include multiple detector elements. Detector 34 can be used to generate a TES as well as a focus error signal (FES) using well-known techniques.

The portion of the return beam which is not transmitted through surface 30 of the beam splitter 28 is reflected by surface 30 toward a lens 36 and through a general wave plate 38. The general wave plate 38 modifies the polarization of the portion of the return beam passing through it by a given retardance value between about 90° and 180°. The actual retardance value selected can vary with the application. Factors which should be taken into account in selecting a suitable retardance value include optical head properties, such as phase shifts introduced by beam splitters or other elements, and media properties such as media birefringence. Details regarding selection of a suitable retardance value for wave plate 38 to optimize the data signal CNR in a given embodiment can be found in U.S. Pat. No. 5,282,188, which is assigned to the assignee of the present invention and incorporated by reference herein. Those skilled in the art will recognize that wave plate 38 can be used with any of a number of alternative retardance values and/or plate rotations. In other embodiments of the present invention, the wave plate 38 can be replaced with a liquid crystal variable retarder, such that different retardance values can be readily selected depending on whether apparatus 10 is being used with an MO or WO medium. The variable retarder can be configured in the manner described in U.S. Pat. No. 5,282,188.

The portion of the return beam transmitted through wave plate 38 is then applied to another polarization beam splitter 40. An internal surface 42 of the polarization beam splitter 40 reflects an s-polarized component of the return beam to a first detector 44 and transmits a p-polarized component to a second detector 46. The polarization beam splitter surfaces 18, 30 and 42 can be, for example, multilayer coatings which reflect and/or transmit desired amounts of s-polarized and p-polarized light. It should be noted that any of a number of alternative differential detection arrangements could be used in apparatus 10. For example, the polarization beam splitter 40 could be replaced with a Wollaston beam splitter and the position of detectors 44, 46 could be adjusted such that one detector receives components of the return beam having a p-polarization while the other receives components having an s-polarization. As another alternative, the general wave plate 38 could be replaced with a phase plate selected to remove phase ellipticity in the return beam, and the beam splitter 40 could be a rotatable Wollaston beam splitter rotated to a fixed angle of about 45°. The beam splitter 40 could also be replaced with a larger beam splitter, such as beam splitter 30. In general, the beam splitter 40 separates the portion of the return beam incident thereon into first and second polarization components which are supplied to detectors 44, 46, respectively. Detectors 44, 46 generate first and second data signals from the polarization components. Detectors 44, 46 can be, for example, positive-intrinsic-negative (PIN) or avalanche photodiodes, or any other device capable of detecting incident optical radiation, including multi-element detectors that are used to generate servo signals or alternatively, detectors 44, 46 could be integrated. Suitable photodiodes for detectors 44, 46 include part Nos. FFD100 and FFD200, from EG&G Optoelectronics of Quebec, Canada.

The first and second data signals from detectors 44, 46, respectively, can be used to provide a differential MO data signal which is indicative of data recorded on the MO medium 26. In the embodiment of the present invention, one differential detection channel in apparatus 10 includes detector 44, a first variable gain amplifier 50, and a first error detector circuit 66, while the other differential channel includes detector 46, a second variable gain amplifier 52, and a second error detector circuit 68. The first and second error detector circuits 66, 68 vary the gains of amplifiers 50, 52, respectively, in accordance with feedback signals $V_{C1}$, $V_{C2}$, respectively, to generate first and second gain adjusted data signals, respectively. Feedback signals $V_{C1}$, $VC_2$ are generated as a function of a gain adjusted FFM signal from the front facet detector 22, the gain being adjusted by a variable gain amplifier 60 in accordance with a set point voltage $V_S$ from, for example, a microprocessor-controlled voltage source (not shown). The set point voltage $V_S$ could be fixed if, for example, all light conditions in the optical head are well known and do not exceed the dynamic range of the apparatus. Alternatively, the set point voltage $V_S$ could be adjustable if, for example, the light conditions are known to change due to media reflectivity differences. Such change in light conditions can occur, for example, in a universal head having WO and MO capability. In addition, if the dynamic range is inadequate between write and read functions, $V_S$ can be adjusted to maintain the signals within the dynamic range of the apparatus. $V_S$ can also be varied to optimize the data signal amplitude for different playback conditions.

As shown in FIG. 1, the first and second gain adjusted data signals from variable gain amplifiers 50, 52, respectively, are applied to inputs of a differential amplifier 54 which generates an MO data signal as the difference between the first and second gain adjusted data signals. Other signal difference circuits suitable for generating an MO data signal from the first and second gain adjusted data signals could be used in place of the differential amplifier 54.

It will now be assumed that storage medium 26 is a WO medium. A WO data signal can be generated in apparatus 10 from a return beam reflected from, for example, stamped CD-like media or a phase change or ablative WO medium. The return beam is directed through optical components 24, 16, 28, 36, 38 and 40 in the manner previously described in conjunction with the generation of an MO data signal. Detectors 44, 46 generate data signals which pass through variable gain amplifiers 50, 52, respectively, and first and second error detector circuits 66, 68, respectively to produce first and second gain adjusted data signals, respectively. A summing amplifier 56 receives the first and second gain adjusted data signals and combines them to form a sum density-type WO data signal, referred hereinafter as a combined data signal. Data signals can thus be generated for both MO and WO media in apparatus 10 of FIG. 1 by appropriate processing of the data signals from detectors 44, 46. Alternative signal combiners can be utilized in place of the summing amplifier 56.

Optical apparatus 10 also implements a source noise subtraction technique to generate the WO data signal. The uncompensated WO data signal output of summing amplifier 56 is applied to one input of a differential amplifier 58. The gain adjusted FFM signal output from variable gain amplifier 60 is applied to an amplifier 62, and the amplified gain adjusted FFM signal is then applied to another input of differential amplifier 58. The amplitude and phase of the FFM and WO signals at the input of differential amplifier 58 are equalized in a manner to be described in detail below in conjunction with FIG. 2. The output of differential amplifier 58, which is the difference between the amplified gain adjusted FFM signal and the uncompensated WO data signal, is a compensated WO data signal in which source noise-induced fluctuations are substantially reduced.

Apparatus 10 in accordance with the present invention, as shown in FIG. 1, also includes a source power control circuit 70. The FFM signal output from the front facet detector 22 is applied as a control signal to a source driver (not shown) connected to the source 12. The source driver converts the output voltage of a preamplifier 64 to a drive current suitable for controlling the output power of source 12. The circuit 70 adjusts the source driver output and thereby the intensity level of the radiation beam generated by source 12. The circuit 70, source driver, source 12 and front facet detector 22 thus form a source power servo loop which adjusts the source power as a function of the FFM signal.

Any of a number of alternative techniques could be used to detect radiation from optical source 12 in order to provide an indication of the intensity level of the incident beam. For example, radiation from a rear facet of a laser diode optical source could be detected by suitable arrangement of the front facet detector 22 in a path of the rear facet radiation. It should be noted, however, that front facet radiation often exhibits better linearity and repeatability, and is less susceptible to temperature variation than rear facet radiation. It should also be noted that the FFM signal from the front facet detector 22 can be used to normalize a tracking signal using methods well known to those skilled in the art.

Apparatus 10 can include additional elements (not shown) suitable for processing the FFM signal and the data signals. For example, an analog-to-digital converter, digital signal processor, memory, and digital-to-analog converter can be included to obtain and process samples of the FFM and data signals. The control signals for variable gain amplifiers 50, 52 could be adjusted in response to operating commands generated by the digital signal processor. This technique can be used to adjust signal levels during recording, optical disk drive start-up or other phases of system operation.

Figure 2:
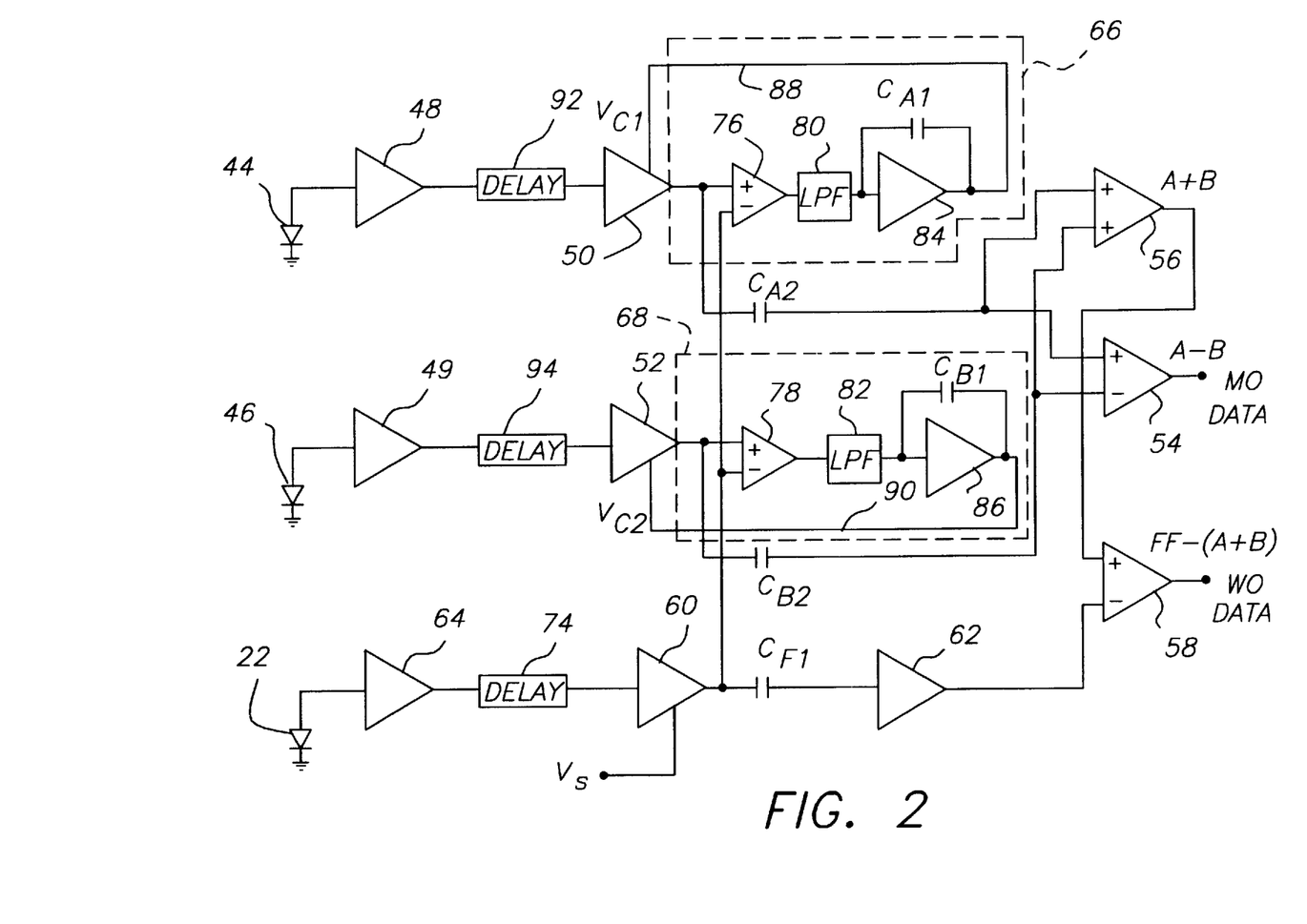
FIG. 2 is a schematic diagram illustrating the source noise subtraction and differential detection circuitry of FIG. 1.

Referring now to FIG. 2, a schematic diagram shows the source noise subtraction and differential detection channels using the front facet servo control of apparatus 10 in greater detail. The source noise subtraction portion of FIG. 2 includes front facet detector 22, which supplies an FFM signal to a preamplifier 64 to produce an amplified FFM signal. The preamplifier 64 can be, for example, an OPA620 amplifier from Burr-Brown, Inc. of Tucson, Ariz. The front facet detector 22 and the preamplifier 64 preferably have a combined bandwidth of approximately three times the highest data signal frequency in the system, although other bandwidths could also be used. The amplified FFM signal output of the preamplifier 64 is applied to variable gain amplifier 60 to produce a gain adjusted FFM signal. The gain of amplifier 60 is controlled by the set point voltage $V_S$ as described in conjunction with FIG. 1 above. The gain adjusted FFM signal is then supplied via capacitor $C_{F1}$ to amplifier 62 which doubles the gain of the gain adjusted FFM signal. Capacitor $C_{F1}$ serves to block the DC component of the gain adjusted FFM signal from reaching amplifier 62, while passing only the alternating-current (AC) component of the gain adjusted FFM signal to amplifier 62. Although those skilled in the art will recognize that $C_{F1}$ does not provide a sharp cut-off at a particular frequency, in this embodiment, AC components are generally considered to be components other than DC. In an alternative embodiment, $C_{F1}$ can be replaced with a more complex signal filter to provide any desired frequency response in the channel, or can be eliminated such that the amplifier 62 receives all signal components including the DC component.

As noted above, a compensated WO data signal is generated by subtracting the uncompensated combined data signal at the output of the summing amplifier 56 from the FFM signal supplied by amplifier 62. Maximum common-mode noise rejection for the compensated WO data signal output is realized when the combined data signal matches the FFM signal in both amplitude and phase. In the embodiment of FIG. 2, the combined data signal is driven to a level of the gain adjusted FFM signal by first and second error detector circuits 66, 68 in a manner to be described below. Amplifier 62, therefore, preferably has a gain of about 2.0 such that the FFM signal is amplitude matched with the combined data signal at the input of differential amplifier 58. Alternatively, the combined data signal can be divided approximately in half prior to front facet subtraction. The bandwidth of error detector circuits 66, 68 in the data detection channels is preferably comparable to the bandwidth of the front facet detector 22 and the preamplifier 64 combination, such that wideband matching of amplitude and phase are provided for both the FFM and the combined data signal.

Apparatus 10 includes delay elements 74, 92, and 94, which are connected between preamplifiers 64, 49, 48, respectively, and variable gain amplifiers 60, 50, 52, respectively, in order to provide proper phase matching of the FFM signal and the first and second data signals at the input of differential amplifier 58. Alternatively, delay elements 74, 92, and 94 can be positioned after capacitors $C_{F1}$, $C_{A2}$, and $C_{B2}$, respectively. In general, the amplifiers used in the circuitry of FIG. 2 exhibit relatively linear group delay responses. A constant group delay can generally be considered as a fixed signal propagation time independent of frequency. Thus, the FFM and combined data signal channels can be phase equalized using a passive analog delay line providing a fixed amount of delay. Delay elements 74, 92, 94 can therefore be, for example, manually or electronically controlled programmable delay lines which provide a selectable amount of delay in discrete increments, or multiple delay lines providing a desired total amount of delay. One suitable device is the ten nanosecond, ten tap variable delay line part No. 60Z14A010H from Sprague Electric Co. of Stamford, Conn. Alternatively, delay elements 74, 92, 94 can be single fixed amounts of delay calculated to provide the desired phase matching at the input of the differential amplifier 58. The term "delay line" as used herein refers to devices providing either fixed or adjustable amounts of delay using physical lengths of transmission line or any other suitable delay mechanism. The amount of delay provided by delay elements 74, 92, 94 will generally vary depending upon the relative length of the FFM and data signal paths. It is preferred that the phase difference between the two signals at the input of the differential amplifier 58 is reduced to a value less than about five degrees at the highest data signal frequency of interest, although larger phase differences can be acceptable in a given application. Of course, reducing the phase difference to zero will produce maximum common-mode noise rejection in amplifier 58. Although delay elements 92, 94 are shown in both signal channels in FIG. 2, it should be understood that delay can be introduced in any one of the channels, or none of the channels if matching of the FFM and data signals is adequate.

The differential detection channels in FIG. 2 will now be described. As described in conjunction with FIG. 1 above, the detection channels each include a separate error detector circuit 66 or 68 in which a feedback signal $V_{C1}$ or $V_{C2}$ is generated and used to adjust the gain of amplifier 50 or 52, respectively. The variable gain amplifiers 50, 52 are adjusted such that data signal high-frequency (HF) components provided to the differential amplifier 54 are substantially matched in amplitude. The gain adjustments are made by comparing direct-current (DC) and other LF components in the data signals to the gain adjusted FFM signal output from variable gain amplifier 60. Error detector circuits 66, 68 each function as a servo loop which matches data signal amplitudes at the input of differential amplifier 54 and thereby maximizes common-mode rejection and the output SNR of the MO data signal. In addition, settling time characteristics of the differential detection channels are improved by substantially minimizing gain changes while going from read to write functions. Frequently when an input to a servo loop rapidly changes, there is often an initial rise or fall of the output of the servo, which is a transient response. By the use of the term "settling time characteristics" is meant the time required for the servo loop output to settle within a predetermined accuracy following the transient.

Error detector circuits 66, 68 include error detector/integrators 76, 78, low pass filters (LPF) 80, 82 and feedback signal lines 88, 90, respectively. In this embodiment, variable gain amplifiers 50, 52 are connected to detectors 44, 46 through preamplifiers 48, 49, respectively. Preamplifiers 48, 49 can be OPA620 amplifiers from Burr-Brown, Inc. of Tucson, Ariz. In other embodiments, preamplifiers 48, 49 could be eliminated and variable gain amplifiers 50, 52 could serve as preamplifiers.

The gain adjusted data signals from variable gain amplifiers 50, 52 are each supplied to an input of error detector/integrators 76, 78, respectively. The gain adjusted FFM signal from amplifier 60 is supplied to a second input of error detectors/integrators 76, 78. Error detector/integrators 76, 78 compare the first and second gain adjusted data signals with the gain adjusted FFM signal in integrating amplifiers 84, 86, respectively, to generate error signals. Low-pass filters (LPF) 80, 82 are positioned between error detector/integrators 76, 78 and integrating amplifiers 84, 86, respectively, to filter the error signals such that low-frequency (LF) components thereof are supplied to an input of integrating amplifiers 84, 86. The cut-off frequency of filters 80, 82 can be, for example, selected between about 10 kHz and 100 kHz in order to minimize the effects of system noise on the source power. Amplifiers 84, 86 are configured to integrate the difference between the LF components of the detected error signals and the gain adjusted FFM signal over time using capacitors $C_{A1}$, $C_{B1}$, respectively. The integrated error signal outputs of amplifiers 84, 86 are fed back via lines 88, 90 as feedback signal inputs $V_{C1}$, $V_{C2}$ to variable gain amplifiers 50, 52, respectively. Each error detector circuit 66, 68 acts to maintain an error signal of zero volts within the bandwidth of the loop. The data signals from amplifiers 50, 52 are also supplied via capacitors $C_{A2}$ and $C_{B2}$ to differential amplifier 54. Capacitors $C_{A2}$ and $C_{B2}$ serve to block the DC components of the data signals from reaching differential amplifier 54, while passing only alternating-current (AC) components of the data signals to amplifier 54. It is to be appreciated that using the AC coupled signals increases the dynamic range of the apparatus. Although those skilled in the art will recognize that $C_{A2}$ and $C_{B2}$ do not provide a sharp cut-off at a particular frequency, in this embodiment, AC components are generally considered to be components other than DC. In alternative embodiments, $C_{A2}$ and $C_{B2}$ can be replaced with more complex signal filters to provide any desired frequency response in the channel, or can be eliminated such that differential amplifier 54 receives all signal components including DC components.

Variable gain amplifiers 50, 52 are preferably matched amplifiers in a device such as the Model No. AD602 available from Analog Devices of Norwood, Mass. The AD602 package includes two matched, low noise, voltage-controlled amplifiers with relatively stable group delay, a maximum control bandwidth of about 1 MHz, an amplification bandwidth of about 35 MHz independent of gain setting, a gain scaling of about 32 dB/volt and a gain range of about −10 dB to +30 dB. Of course, amplifiers with other bandwidth and gain parameters could also be used. Alternative variable gain amplifiers include the part Nos. CLC 520 or CLC 522 from Comlinear, Inc. of Fort Collins, Colo., and the part No. VCA-610 from Burr-Brown, Inc. of Tucson, Ariz. It should be emphasized that these are examples only, and numerous other alternatives will be apparent to those skilled in the art. Other embodiments could use different types of variable gain circuits to alter signal level in response to an input control signal. For example, a variable attenuator providing a variable amount of signal attenuation in response to a control input is considered a variable gain circuit herein.

Low pass filters 80, 82 limit the bandwidth of the portion of the data signal that is fed back to control the gain of variable gain amplifiers 50, 52, respectively. This bandwidth limiting reduces potential oscillations and modulation noise in the loops before the integrating amplifiers 84, 86. Modulation noise can result when HF components of the first and second data signals have different amplitudes or a duty cycle other than fifty percent. A mismatch in data signal amplitudes at the input of differential amplifier 54 can then arise even though the DC and/or LF components of the data signals have been equalized by the servo loops. The magnitude of the channel gain error from modulation noise is generally dependent on the cross-channel amplitude mismatch, the degree to which the duty cycle deviates from fifty percent, and the amplitude of the DC signal components. Filters 80, 82 can be implemented as, for example, single-pole resistor-capacitor (RC) networks. Higher order filters could also be used, depending on the amount of filtering required in a given application. A single-pole filter suitable for use in a system in which the data signal HF components approach 10 MHz has a 3 dB passband of about 100 kHz and reduces modulation noise by approximately 30 dB. Specific values for the servo control loop parameters will be optimized for a given apparatus. Important factors include, but are not limited to, charge content of the code, and frequency of the media disturbances including nonuniformity, substrate and/or coversheet birefringence. The cut-off frequency of filters 76, 78 is limited on the high end by the system data rate and on the low end by the highest frequency of the system perturbations that the servo is required to track. For example, in certain applications, it can be desirable for the servos to track media birefringence-induced distortions at frequencies of up to 5 kHz or more. A suitable cut-off frequency for use in many optical storage applications is about 100 kHz. This cut-off frequency refers to a frequency above which signal components are attenuated by about 10 dB or more.

Integrating amplifiers 84, 86 are preferably low offset, low bandwidth devices such as the OP400 amplifiers from Analog Devices of Norwood, Mass. A low offset can limit channel gain error, and a low bandwidth can provide further filtering of modulation noise. In a preferred embodiment, the bandwidth of amplifiers 84, 86 is about six to ten times the cutoff frequency of low pass filters 80, 82. This value maintains the low pass filter passband as the dominant passband control of the system.

The embodiment of the invention illustrated in FIGS. 1 and 2 provides a number of advantages. For example, the gain adjusted FFM signal is used to servo the error detector circuits 66, 68 in the differential detection channels. Because the gain adjusted FFM signal is used rather than a fixed DC voltage, the proportion of light between the FFM and the differential detection channels does not change during the transition from reading to writing. This permits the bandwidth of error detectors 66, 68 to be substantially reduced from the current implementation of prior art apparatus. The reduction of bandwidth causes a decrease in data detection channel and system noise, as well as improves the low frequency response and the settling time characteristics of the data detection channels. In addition, the gain adjusted FFM signal is used to control both the error detector circuits 66, 68 and the source power control circuit 70, thereby simplifying overall system control and processing. Furthermore, this improved control is provided without significantly increasing the cost or complexity of the optical head. The invention permits implementation of a universal optical head capable of generating MO, WO, and other data signals from a variety of different optical media. Allowing $V_S$ to change enables the data signal amplitude to be optimized.

Alternative embodiments can include operation of the error detector circuits using high-frequency components of the data signals, in addition to or in place of the low-frequency components used in the FIG. 2 embodiment. Those skilled in the art will recognize that the invention can be implemented using digital servo loops, and that integrators can be replaced with other suitable signal processing circuits.

While the preferred embodiment of the present invention has been shown and described, it will be manifest that many additional changes and modifications can be made therein without departing from the essential spirit of the invention. It is intended, therefore, in the annexed claims, to cover all such changes and modifications as may fall within the true scope of the invention.

| PARTS LIST | |
|---|---|
| C1 | capacitor |
| $C_{A1}$, $C_{A2}$ | capacitors |
| $C_{B1}$, $C_{B2}$ | capacitors |
| $V_{C1}$, $V_{C2}$ | control voltages |
| $V_S$ | set point voltage |
| 10 | optical data storage system |
| 12 | optical source |
| 14 | collimating lens |
| 16 | beam splitter/expander |
| 18 | beam splitter surface |
| 20 | detector focusing lens |
| 22 | front facet detector |
| 24 | objective lens |
| 26 | optical storage medium |
| 26A | data storage surface |
| 26B | transparent substrate |
| 28 | beam splitter |
| 30 | beam splitter surface |
| 32 | detector focusing lens |
| 34 | detector array |
| 36 | lens |
| 38 | wave plate |
| 40 | beam splitter |
| 42 | beam splitter surface |
| 44, 46 | detectors |
| 48, 49 | preamplifiers |
| 50, 52 | variable gain amplifiers |
| 54 | differential amplifier |
| 56 | summing amplifier |
| 58 | differential amplifier |
| 60 | variable gain amplifier |
| 62 | amplifier |
| 64 | preamplifier |
| 66, 68 | error detector circuits |
| 70 | source power control circuit |
| 74 | delay element |
| 76, 78 | error detector/integrators |
| 80, 82 | low pass filters |
| 84, 86 | integrating amplifiers |
| 88, 90 | feedback signal line |
| 92, 94 | delay elements |

What is claimed is:

1. A method for reading data from an optical medium with reduced bandwidth, comprising the steps of:

(a) producing a gain adjusted front facet monitor signal from a laser light beam;

(b) producing first and second data signals from data read from the medium;

(c) producing first and second gain adjusted data signals in response to the gain adjusted front facet monitor signal and first and second data signals, respectively;

(d) producing a magneto-optic data signal in response to the first and second gain adjusted data signals, the magneto-optic data signal being a function of the difference between the first and second gain adjusted data signals, and producing a combined data signal in response to the first and second gain adjusted data signals, the combined data signal being a function of the sum of the first and second gain adjusted data signals; and (e) producing a write-once data signal in response to the gain adjusted front facet monitor signal and the combined data signal, the write-once data signal being a function of the difference between the gain adjusted front facet monitor signal and the combined data signal.

2. A method for reading data from an optical medium with reduced bandwidth, comprising the steps of:

(a) producing a front facet monitor signal from a laser light beam;

(b) producing first and second data signals from data read from the medium;

(c) adjusting the gain of the front facet monitor signal to produce a gain adjusted from facet monitor signal;

(d) producing a first gain adjusted data signal in response to the first data signal and the gain adjusted front facet monitor signal;

(e) producing a second gain adjusted data signal in response to the second data signal and the gain adjusted front facet monitor signal;

(f) producing a magneto-optic data signal in response to the first and second gain adjusted data signals, the magneto-optic data signal being a function of the difference between the first and second gain adjusted data signals;

(g) producing a combined data signal in response to the first and second gain adjusted data signals, the combined data signal being a function of the sum of the first and second gain adjusted data signals; and (h) producing a write-once data signal in response to the gain adjusted front facet monitor signal and the combined data signal, the write-once data signal being a function of the difference between the gain adjusted front facet monitor signal and the combined data signal.

3. The method of claim 2 wherein the step of producing the gain adjusted front facet monitor signal includes:

(i) producing an amplified front facet monitor signal in response to the front facet monitor signal; and (ii) producing the gain adjusted front facet monitor signal in response to the amplified front facet monitor signal.

4. The method of claim 2 further including the step of adjusting the front facet monitor signal and the first and second data signals such that a phase of the front facet monitor signal substantially matches the first and second data signals.

5. The method of claim 3 further including the step of doubling the gain of the gain adjusted front facet monitor signal.

6. The method of claim 2 wherein the steps of producing the first and second gain adjusted data signals each include the steps of:

(i) producing first and second feedback signals in response to the gain adjusted front facet monitor signal and to the first and second gain adjusted data signals, respectively; and (ii) producing the first and second gain adjusted data signals in response to the first and second feedback signals.

7. A method for reading data from a magneto-optic medium with reduced bandwidth, comprising the steps of:

(a) producing a gain adjusted front facet monitor signal from a laser light beam;

(b) producing first and second data signals from data read from the medium;

(c) producing first and second gain adjusted data signals in response to the gain adjusted front facet monitor signal and first and second data signals, respectively; and (d) producing a magneto-optic data signal in response to the first and second gain adjusted data signals, the magneto-optic data signal being a function of the difference between the first and second gain adjusted data signals.

8. The method of claim 7 wherein the step of producing the gain adjusted front facet monitor signal includes:

(i) producing an amplified front facet monitor signal in response to the front facet monitor signal; and (ii) producing the gain adjusted front facet monitor signal in response to the amplified front facet monitor signal.

9. The method of claim 7 further including the step of adjusting the front facet monitor signal and the first and second data signals such that a phase of the front facet monitor signal substantially matches the first and second data signals.

10. The method of claim 8 further including the step of doubling the gain of the gain adjusted front facet monitor signal.

11. The method of claim 7 wherein the steps of producing the first and second gain adjusted data signals each include the step of:

(i) producing first and second feedback signals in response to the gain adjusted front facet monitor signal and to the first and second gain adjusted data signals, respectively; and (ii) producing the first and second gain adjusted data signals in response to the first and second feedback signals.

12. A method for reading data from a write-once optical medium with reduced bandwidth, comprising the steps of:

(a) producing a gain adjusted front facet monitor signal from a laser light beam;

(b) producing first and second data signals from data read from the medium;

(c) producing first and second gain adjusted data signals in response to the gain adjusted front facet monitor signal and first and second data signals, respectively;

(d) producing a combined data signal in response to the first and second gain adjusted data signals, the combined data signal being a function of the sum of the first and second gain adjusted data signals; and (e) producing a write-once data signal in response to the gain adjusted front facet monitor signal and the combined data signal, the write-once data signal being a function of the difference between the gain adjusted front facet monitor signal and the combined data signal.

13. The method of claim 12 wherein the step of producing the gain adjusted front facet monitor signal includes:

(i) producing an amplified front facet monitor signal in response to the front facet monitor signal; and (ii) producing the gain adjusted front facet monitor signal in response to the amplified front facet monitor signal.

14. The method of claim 12 further including the step of adjusting the front facet monitor signal and the first and second data signals such that a phase of the front facet monitor signal substantially matches the first and second data signals.

15. The method of claim 13 further including the step of doubling the gain of the gain adjusted front facet monitor signal.

16. The method of claim 12 wherein the steps of producing the first and second gain adjusted data signals each include the step of:

(i) producing first and second feedback signals in response to the gain adjusted front facet monitor signal and to the first and second gain adjusted data signals, respectively; and (ii) producing the first and second gain adjusted data signals in response to the first and second feedback signals.

\* \* \* \* \*